United States Patent
Ben Rached et al.

(10) Patent No.: US 11,258,164 B2
(45) Date of Patent: Feb. 22, 2022

(54) ANTENNA ARRAYS

(71) Applicant: Nokia Technologies Oy, Espoo (FI)

(72) Inventors: Nidham Ben Rached, Paris (FR); Veronique Capdevielle, Magny les Hameaux (FR); Patrick Albert Krief, Savigny sur Orge (FR); Afef Feki, Sceaux (FR)

(*) Notice: Subject to any disclaimer, the term of this patent is extended or adjusted under 35 U.S.C. 154(b) by 0 days.

(21) Appl. No.: 16/445,553

(22) Filed: Jun. 19, 2019

(65) Prior Publication Data
US 2020/0044310 A1 Feb. 6, 2020

(30) Foreign Application Priority Data
Jul. 31, 2018 (FI) .................................. 20185663

(51) Int. Cl.
*H01Q 1/24* (2006.01)
*H01Q 21/00* (2006.01)
(Continued)

(52) U.S. Cl.
CPC ......... *H01Q 1/243* (2013.01); *H01Q 21/0087* (2013.01); *H04B 7/0613* (2013.01); *H04W 56/001* (2013.01)

(58) Field of Classification Search
None
See application file for complete search history.

(56) References Cited

U.S. PATENT DOCUMENTS 3,906,500 A * 9/1975 Redman ............... G01S 7/4052
                                                              342/167
4,173,019 A * 10/1979 Williams ............. H01Q 9/0407
                                                              343/700 MS
(Continued)

FOREIGN PATENT DOCUMENTS

KR     2017-0090661 A     8/2017
WO     WO 2013/170169    11/2013
(Continued)

OTHER PUBLICATIONS

3GPP TSG RAN WG1 Meeting #93, Busan, Korea May 21-25, 2018, R1-1806660, "NR Support for IAB", Nokia, Nokia Shanghai Bell, 5 pgs.

*Primary Examiner* — Noel R Beharry
*Assistant Examiner* — Richard Schnell
(74) *Attorney, Agent, or Firm* — Harrington & Smith

(57) ABSTRACT

An apparatus and method is disclosed in relation to antenna arrays. The method may include transmitting a reference signal to one or more remote user terminals from each of a plurality of sub-arrays of an antenna array, each sub-array including a quantity of radiating elements of the antenna array capable of establishing a backhaul link with a remote communications node. The method may also include receiving measurement signals from the one or more remote user terminals, indicative of one or more characteristics of the received reference signals. The method may also include selecting, based on received measurement signals, a first subset of the sub-arrays for backhaul communications with the remote communications node and a second subset of the sub-arrays, including one or more of the remaining sub-arrays, for access communications with the one or more remote user terminals.

17 Claims, 6 Drawing Sheets

(51) Int. Cl.
*H04B 7/06* (2006.01)
*H04W 56/00* (2009.01)

(56) References Cited

U.S. PATENT DOCUMENTS

| | | | | |
|---|---|---|---|---|
| 5,991,596 | A | * | 11/1999 | Cunningham ..... H04B 7/18584 455/12.1 |
| 8,195,191 | B1 | * | 6/2012 | Falk ...................... H04W 64/00 455/456.1 |
| 9,948,375 | B2 | | 4/2018 | Yu et al. |
| 2013/0142136 | A1 | | 6/2013 | Pi et al. ......................... 370/329 |
| 2013/0155847 | A1 | * | 6/2013 | Li ......................... H04W 24/04 370/225 |
| 2014/0177683 | A1 | * | 6/2014 | Krishnamurthy ...... H04B 7/065 375/219 |
| 2014/0204846 | A1 | | 7/2014 | Maltsev et al. ............... 370/329 |
| 2015/0208443 | A1 | * | 7/2015 | Jung .................... H04W 72/04 370/329 |
| 2018/0249461 | A1 | * | 8/2018 | Miao ..................... H04W 48/16 |
| 2018/0263004 | A1 | * | 9/2018 | Andersson ............ H04L 5/0007 |

FOREIGN PATENT DOCUMENTS

| | | |
|---|---|---|
| WO | WO 2016/148838 | 9/2016 |
| WO | WO 2017/067138 | 4/2017 |

\* cited by examiner

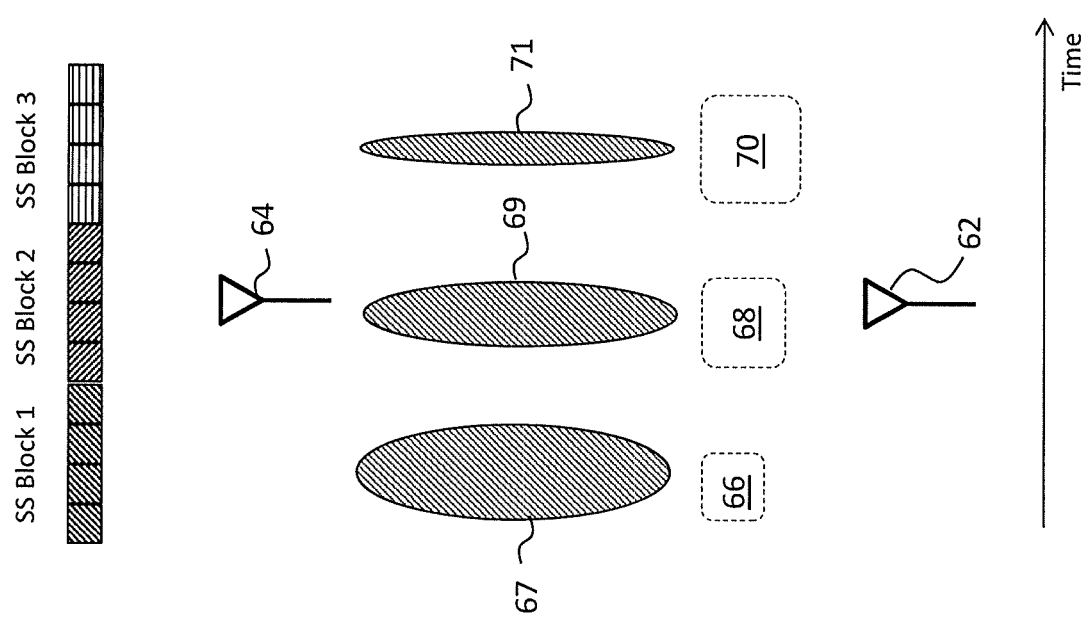

ANTENNA ARRAYS

FIELD

Example embodiments relate to antenna arrays.

BACKGROUND

An antenna array is set of multiple antennas which may work together as a single antenna to transmit and/or receive radio frequency waves. The radio waves radiated by each antenna may combine to contribute constructively to enhance the power radiating in desired directions and cancel by interfering destructively to reduce the power radiated in other directions. An antenna array can achieve higher gain than can be achieved by a single antenna. Antenna arrays may be employed in cellular base stations, as is envisaged for next-generation standards such as the $5^{th}$ Generation (5G) new radio (NR) standard.

SUMMARY

An embodiment provides an apparatus, comprising: means for transmitting a reference signal to one or more remote user terminals from each of a plurality of sub-arrays of an antenna array, each sub-array comprising a quantity of radiating elements of the antenna array capable of establishing a backhaul link with a remote communications node; means for receiving measurement signals from the one or more remote user terminals, indicative of one or more characteristics of the received reference signals; and means for selecting, based on received measurement signals, a first subset of the sub-arrays for backhaul communications with the remote communications node and a second subset of the sub-arrays, comprising one or more of the remaining sub-arrays, for access communications with the one or more remote user terminals.

The selecting means may be configured to select for the second subset all remaining sub-arrays for access communications with the one or more remote user terminals.

The receiving means may be configured to receive measurement signals indicative of interference of the respective reference signals at the one or more remote user terminals, and the selecting means may be configured to select the subset of sub-arrays for backhaul communications corresponding to measured interference at or below an acceptable threshold.

The selecting means may be further configured to select the subset of sub-arrays for backhaul communications corresponding to a maximum beamwidth, in addition to the measured interference being at or below the acceptable threshold.

The provided plurality of sub-arrays may comprise different respective numbers of radiating elements to provide different respective beamwidths.

The transmitting means may be configured to transmit the reference signals sequentially, in descending order starting from the sub-array having the greatest beamwidth.

The receiving means may be configured to receive measurement signals indicative of the received power of the respective reference signals by the one or more remote user terminals, and the selecting means is configured to select the subset of sub-arrays for backhaul communications corresponding to received power being at or below an acceptable power threshold.

The apparatus may further comprise means for communicating backhaul signals to a remote communications node using the selected first subset of sub-arrays and means for communicating access signals to one or more user equipment.

The reference signals may be transmitted as Synchronisation Signal Block (SSB) signals and/or Beam Reference Signals (BRS).

The apparatus of any preceding definition may be associated with a cellular base station comprising the antenna array.

Another embodiment may provide a method, comprising: transmitting a reference signal to one or more remote user terminals from each of a plurality of sub-arrays of an antenna array, each sub-array comprising a quantity of radiating elements of the antenna array capable of establishing a backhaul link with a remote communications node; receiving measurement signals from the one or more remote user terminals, indicative of one or more characteristics of the received reference signals; and selecting, based on received measurement signals, a first subset of the sub-arrays for backhaul communications with the remote communications node and a second subset of the sub-arrays, comprising one or more of the remaining sub-arrays, for access communications with the one or more remote user terminals.

The method may comprise selecting for the second subset all remaining sub-arrays for access communications with the one or more remote user terminals.

The receiving may comprise receiving measurement signals indicative of interference of the respective reference signals at the one or more remote user terminals, and selecting may comprise selecting the subset of sub-arrays for backhaul communications corresponding to measured interference at or below an acceptable threshold.

Selecting may comprise selecting the subset of sub-arrays for backhaul communications corresponding to a maximum beamwidth, in addition to the measured interference being at or below the acceptable threshold.

The plurality of sub-arrays may comprise different respective numbers of radiating elements to provide different respective beamwidths.

The transmitting means may be configured to transmit the reference signals sequentially, in descending order starting from the sub-array having the greatest beamwidth.

The received measurement signals may be indicative of the received power of the respective reference signals by the one or more remote user terminals, and selecting may comprise selecting the subset of sub-arrays for backhaul communications corresponding to received power being at or below an acceptable power threshold.

The method may further comprise communicating backhaul signals to a remote communications node using the selected first subset of sub-arrays and communicating access signals to one or more user equipment using the remaining sub-arrays.

The reference signals may be transmitted as Synchronisation Signal Block (SSB) signals and/or Beam Reference Signals (BRS).

The method of any preceding definition may be performed at a cellular base station comprising the antenna array.

Another embodiment may provide an apparatus comprising at least one processor and at least one memory directly connected to the at least one processor, the at least one memory including computer program code, and the at least one processor, with the at least one memory and the computer program code being arranged to perform the method of: transmitting a reference signal to one or more remote user terminals from each of a plurality of sub-arrays of an antenna array, each sub-array comprising a quantity of radiating elements of the antenna array capable of establishing a backhaul link with a remote communications node; receiving measurement signals from the one or more remote user terminals, indicative of one or more characteristics of the received reference signals; and selecting, based on received measurement signals, a first subset of the sub-arrays for backhaul communications with the remote communications node and a second subset of the sub-arrays, comprising one or more of the remaining sub-arrays, for access communications with the one or more remote user terminals.

Another embodiment may provide a computer program product comprising a set of instructions which, when executed on an apparatus, are configured to cause the apparatus to carry out the method of: transmitting a reference signal to one or more remote user terminals from each of a plurality of sub-arrays of an antenna array, each sub-array comprising a quantity of radiating elements of the antenna array capable of establishing a backhaul link with a remote communications node; receiving measurement signals from the one or more remote user terminals, indicative of one or more characteristics of the received reference signals; and selecting, based on received measurement signals, a first subset of the sub-arrays for backhaul communications with the remote communications node and a second subset of the sub-arrays, comprising one or more of the remaining sub-arrays, for access communications with the one or more remote user terminals.

Another embodiment may provide a non-transitory computer readable medium comprising program instructions stored thereon for performing a method, comprising: transmitting a reference signal to one or more remote user terminals from each of a plurality of sub-arrays of an antenna array, each sub-array comprising a quantity of radiating elements of the antenna array capable of establishing a backhaul link with a remote communications node; receiving measurement signals from the one or more remote user terminals, indicative of one or more characteristics of the received reference signals; and selecting, based on received measurement signals, a first subset of the sub-arrays for backhaul communications with the remote communications node and a second subset of the sub-arrays, comprising one or more of the remaining sub-arrays, for access communications with the one or more remote user terminals.

DESCRIPTION OF DRAWINGS

Example embodiments will now be described by way of non-limiting example with reference to the accompanying drawings, in which:

FIG. 6 is a schematic view useful for understanding the FIG. 4 or FIG. 5 process for a base station in relation to a relay node according to an example embodiment;

DETAILED DESCRIPTION

Example embodiments relate to antenna arrays, and to an apparatus, method and computer program product for selection of one or more sub-arrays of an antenna array for backhaul communications and one or more other sub-arrays for access communications. Example embodiments base the selection on received signals from user terminals in response to receiving a reference signal from each sub-array.

In the context of a telecommunications network, such as a cellular telecommunications network, the backhaul portion of the network and the access portion of the network are distinguished as follows. The backhaul portion comprises the communications channel or channels between a first network node, typically a base station or equivalent, and other network nodes in the network that apply intelligence, e.g. call aggregation and/or routing intelligence. The backhaul portion may also comprise the channel between the base station and the core network. The backhaul portion may also carry communications between relay nodes within a particular cell or between neighbouring cells. The access network portion, on the other hand, is that part which handles voice and/or data communications with remote user equipment, e.g. mobile terminals, within the base station's cell.

Figure 1:
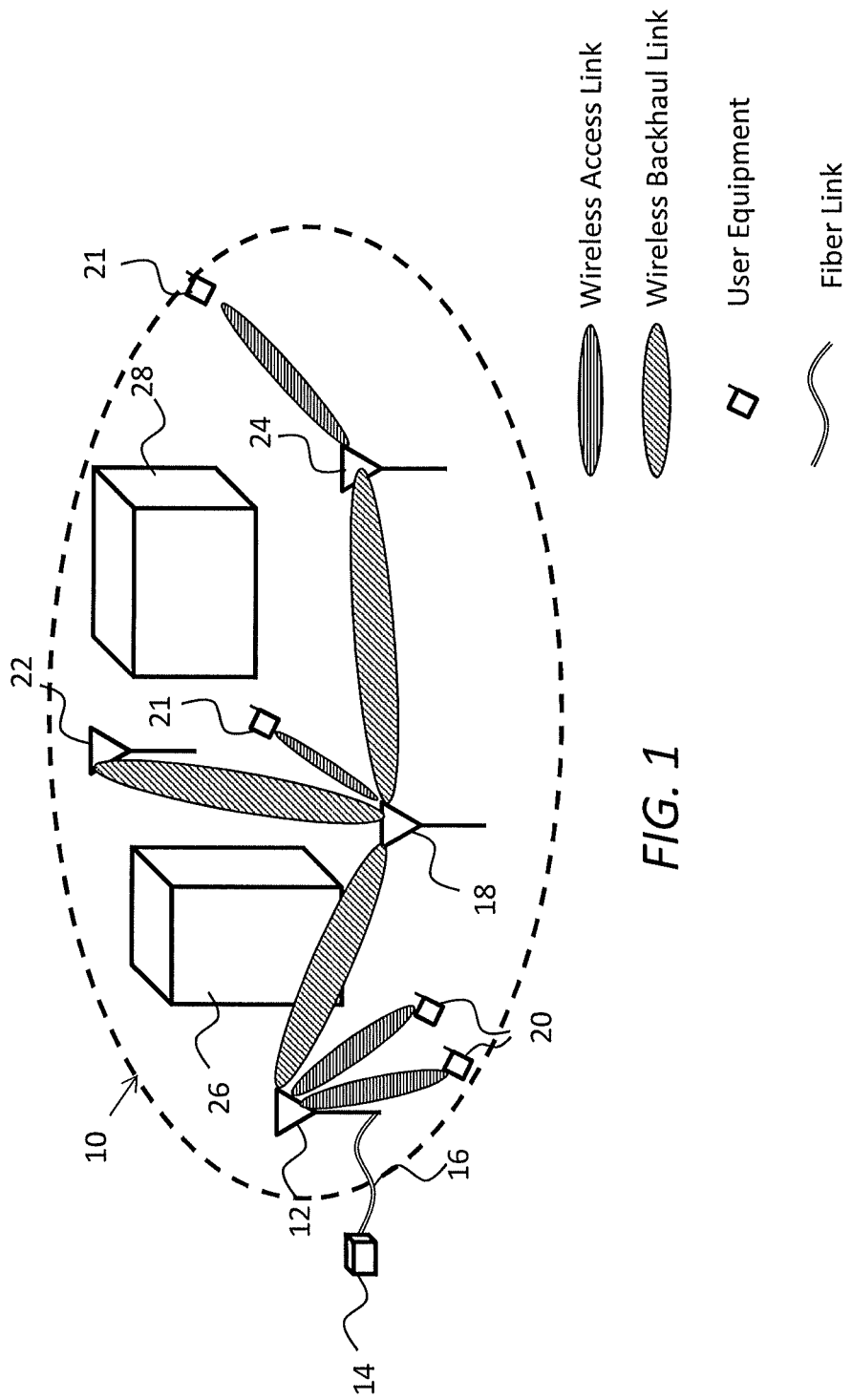
FIG. 1 is a schematic view of a region of interest of a cellular network comprising network infrastructure and user equipment.

FIG. 1 shows a region of interest 10 of a cellular network in which a base station (gNB) 12 is shown connected to a remote network node 14 which may provide network intelligence or which may be part of the core network. Buildings 26, 28 (or other physical structures) are shown for reference. The connection between the base station 12 and the network node 14 may be by means of a wired link, such as an optical fiber link 16, or a wireless link. This link 16 may be considered part of the backhaul portion of the network. The base station 12 may handle voice and/or data traffic from one or more user equipment (UE) 20, having line of sight or non-line of sight to the base station via the access portion of the network. The base station 12 may also handle voice and/or data traffic with one or more other user equipment 21 which are not in the coverage area of the base station (or are at the edge of the region of interest) via one or more relay nodes 18, 22, 24. The relay nodes 18, 22, 24 communicate with said user equipment 21 via the access portion of the network, and relay the data to the base station 12 using the backhaul portion as indicated.

In example embodiments herein, the base station 12 may comprise an antenna array comprised of a panel or other body carrying multiple antenna elements, hereafter referred to as radiating elements, although it will be appreciated that the radiating elements may also receive radiofrequency signals. The antenna array may be mounted on a tower.

The backhaul portion of a communications network may be implemented using wired technology, e.g. using optical fibres. However, given the massive densification of communications networks, particularly at mm-wave frequencies (e.g. 30 GHz-300 GHz) for LTE, 5G New Radio (NR) and next generation communications networks, wireless backhauling is more attractive as it allows simpler deployment and incremental rollout. Further, given the large bandwidth available at such frequencies, it is also attractive for use in the access network portion.

Integrated Access and Backhauling (IAB) is a proposed method whereby backhaul and access communications share the same radio resources. Embodiments herein relate to in-band IAB where IAB nodes embed backhaul related capabilities and access capabilities over the same wireless channel. Embodiments herein have advantages in that they mitigate cross-link interference between backhaul and access communications.

Figure 2:
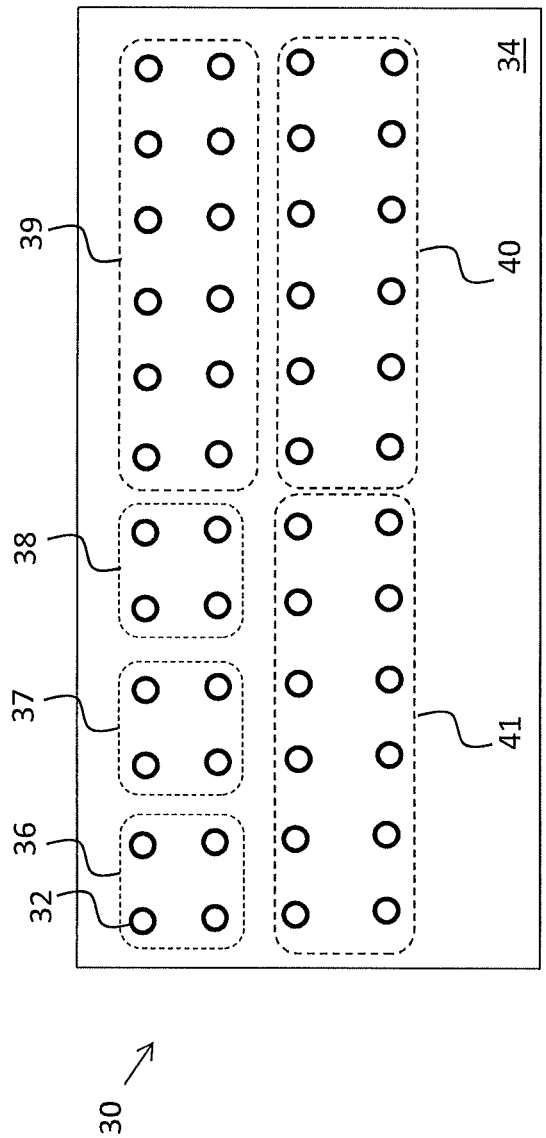
FIG. 2 is a schematic view of an antenna array according to an example embodiment.

FIG. 2 is a schematic view of an antenna array 30 that may be provided at the FIG. 1 base station 12 for transmitting and receiving purposes. The antenna array 30 may also be provided at one or more of the relay nodes 18, 22, 24.

The antenna array 30 may be provided on a tower (not shown) and may comprise a plurality of radiating elements 32 carried by a panel or body 34. It will be appreciated that said radiating elements are also capable of receiving radiofrequency energy. The radiating elements 32 may be arranged as a grid, or in any other two or three-dimensional arrangement.

In example embodiments, the radiating elements 32 are arranged into so-called sub-arrays 36-41. The sub-arrays 36-41 may each comprise any number of two or more radiating elements 32. The sub-arrays 36-41 may comprise the same or different numbers of radiating elements 32 for producing different radiating (and receiving) beams. In particular, it may be noted that a sub-array with fewer radiating elements 32 will produce a beam that is larger (wider) than a sub-array with a greater number of radiating elements. The beamforming gain and spectral efficiency are greater for smaller beamwidths.

Each sub-array 36-41 may have an associated signal processing chain.

The provision of multiple sub-arrays 36-41 is based on so-called hybrid beamforming technology which uses a single panel of radiating elements 32 to synthetize multiple beams, e.g. for access and for the backhaul transmissions. With hybrid beamforming technology, a base band pre-coder implementation may be split into analog and digital planes. The advantages of this technology include cost savings, due to the reduced number of radiofrequency chains, compared with a fully digital pre-coding solution, and a reduction in complexity, due to the usage of multiple antennas and their related inter-antenna synchronisation and co-ordination.

Multiple beam synthesis is notably enabled with a so-called partially connected hybrid architecture whereby each RF chain is connected to a subset of radiating elements, namely a sub-array, of which there are a plurality shown in FIG. 2.

Figure 3:
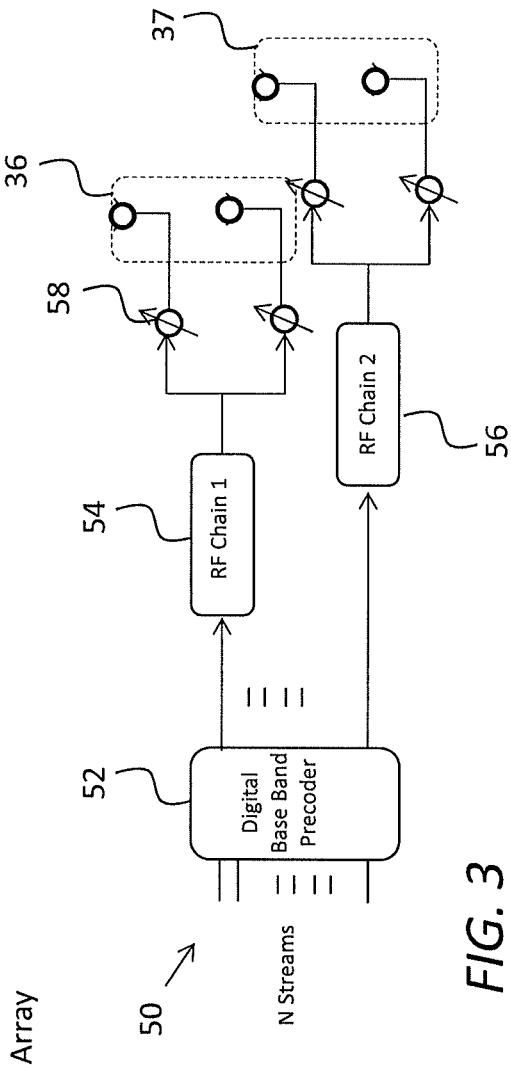
FIG. 3 is a hybrid architecture 50 in relation to two sub-arrays of the FIG. 2 antenna array 30 according to an example embodiment.

FIG. 3 shows an example partially connected hybrid architecture 50 in relation to two such sub-arrays 36, 37 of the FIG. 2 antenna array 30. For ease of explanation, only two radiating elements 32 are shown in each of the sub-arrays 36, 37 instead of four. The architecture 50 may comprise a digital base band pre-coder 52 connected to respective first and second radiofrequency chains 54, 56 which are common to the radiating elements of the two sub-arrays 36, 37.

The beam produced per sub-array 36, 37 may be formed based on weights applied to the base band pre-coder 52 and on analog phase shifters 58 of the radio frequency pre-coders. Thus, there may be as many beams produced simultaneously as there are sub-arrays 36, 37. The FIG. 3 principle can be expanded to the six sub-arrays 36-41 shown in FIG. 2 as will be appreciated.

In example embodiments, it follows that the antenna array 30 can simultaneously transmit backhaul and access beams, corresponding to the links shown in FIG. 1. Example embodiments enable mitigation of mutual interference between the backhaul and access beams, and may maintain or increase spectral efficiency. This may be performed by leveraging the spatial separability of the beams to support radio resource reuse for backhaul and access transmissions.

Example embodiments may be used for mm wavelength applications, e.g. in 5G New Radio (NR) and next generation cellular communications. However, example embodiments are not limited to such mm wavelength applications. Example embodiments build on the principles of Integrated Access and Backhauling (IAB) and sub-array based hybrid beamforming.

Example embodiments assume that the higher the number of radiating elements 32 used in a sub-array 36-41 for beamforming, either in the azimuth or elevation plane, the narrower the beamwidth and the higher the beamforming gain and spectral efficiency will be.

Figure 4:
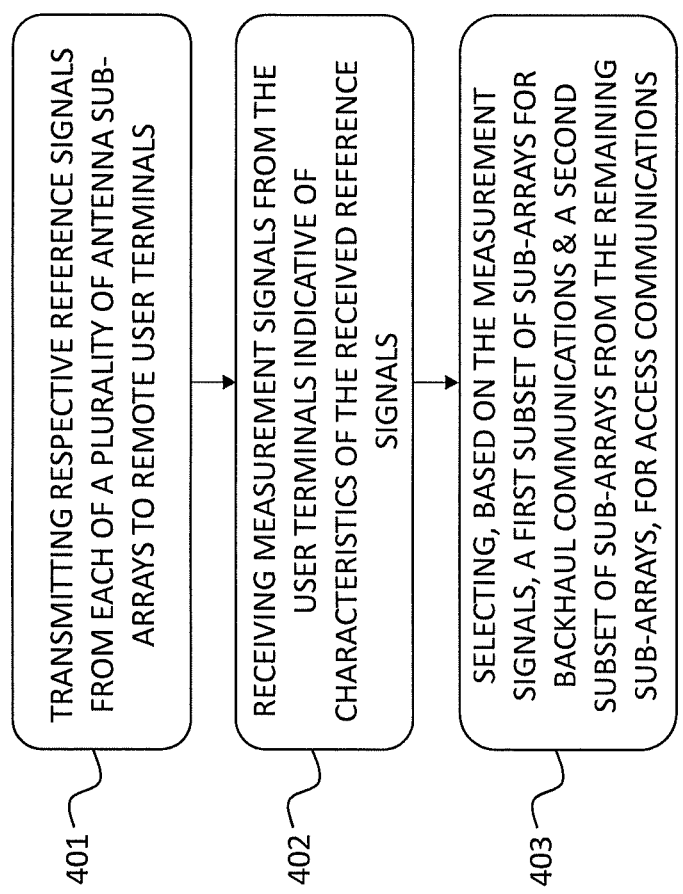
FIG. 4 is a flow diagram showing operations of an apparatus according to an example embodiment.

As indicated in the flow diagram of FIG. 4, which may indicate processing operations of an apparatus according to example embodiments, for example operations performed by hardware, software or a combination thereof, a first operation 401 may comprise transmitting a respective reference signal to one or more user equipment 21 from each of a plurality of sub-arrays 36-41 of the antenna array 30, each sub-array comprising a quantity of radiating elements 32 of the antenna array capable of establishing a backhaul link with a remote communications node, for example one of the relay nodes 18, 22, 24.

Another operation 402 may comprise receiving measurement signals from the one or more remote user equipment 21, indicative of one or more characteristics of the received reference signals. Received signal power is one such characteristic.

Another operation 403 may comprise selecting, based on received measurement signals, a first subset of the sub-arrays 36-41 for backhaul communications with the remote communications node 18, 22, 24 and a second subset of the sub-arrays, comprising one or more of the remaining sub-arrays, for access communications with the one or more remote user equipment 21.

In some embodiments, all remaining sub-arrays may be used for access communications.

An apparatus for performing the operations 401-403 may be physically located at, or is remote from, the base station 12, but nevertheless has control over which sub-arrays 36-41 are used to transmit and receive the backhaul signals and which are used to transmit and receive the access signals. The apparatus may further comprise processing chains for effecting said transmission and reception of signals for the distinct backhaul and access channels.

The sub-arrays 36-41 may be capable of establishing a backhaul link with a remote node, e.g. relay node, which may be its closest geographical neighbour, or a plurality of neighbouring nodes 18, 22, 24 within a predetermined range. This may be to ensure that the sub-arrays 36-41 are suitable candidates for use as backhaul links, if selected.

This may be achieved by ensuring that the maximal beamwidth (or the minimal number of radiating elements 32 of a given sub-array 36-41 in the azimuth and elevation planes) exceeds a minimum threshold so that the one or more neighbouring remote nodes is or are 'reachable' in the coverage area.

There is also a need to minimize, from a statistical point of view, interference of proposed backhaul beams to access beams.

For this reason, embodiments may involve first selecting one or more of the sub-arrays 36-41 as "candidate sub-arrays" for backhaul communications whereby the minimal number of radiating elements 32 are used, for coarsest beamwidth, and then, when selection criteria is or are satisfied, selecting or assigning a subset or all of the remaining sub-arrays (and therefore their constituent radiating elements) for access communications.

The operation 401 of transmitting respective reference signals from each of the sub-arrays 36-41 is for enabling the measurement response in operation 402, which may be indicative of the received characteristics and therefore of interference due to the reference signal in the respective candidate beam. For example, in some embodiments, the remote user equipment 21 may measure and report back to the antenna array 30 the received power measure, or another characteristic related to interference.

In example embodiments, the reference signals may comprise Synchronisation Signal Block (SSB) signals and/or Beam Reference Signals (BRS). SSB signals may correspond to Synchronisation and Physical Broadcast Channel (PBCH) block signals which may be sent as a single block transmitted simultaneously.

In some embodiments, the reference signals may be transmitted from sub-arrays 36-41 of different respective resolutions, e.g. having a different number of radiating elements 32 (or active radiating elements) and which may therefore transmit reference signals using different beamwidths. For example, a reference signal from a sub-array 36-41 having the lowest resolution (e.g. 2×2) may be transmitted first, giving a coarser and wider beamwidth and the received signals from the user equipment 21 inspected or analysed to determine if the interference/received signal power level is within an acceptable range. If so, then that sub-array 36-41 may be selected for backhaul communications, leaving a subset or all of the remainder selectable and usable for access communications. If not, then received signals from the next lowest resolution sub-array 36-41 may be inspected or analysed and the process repeated until the coarsest beamwidth can be identified for backhaul communications, leaving a subset or all of the remaining sub-arrays available for the access communications.

The process can be repeated periodically to account for changes to environmental and/or network conditions, and allocations of sub-arrays 36-41 updated accordingly.

Figure 5:
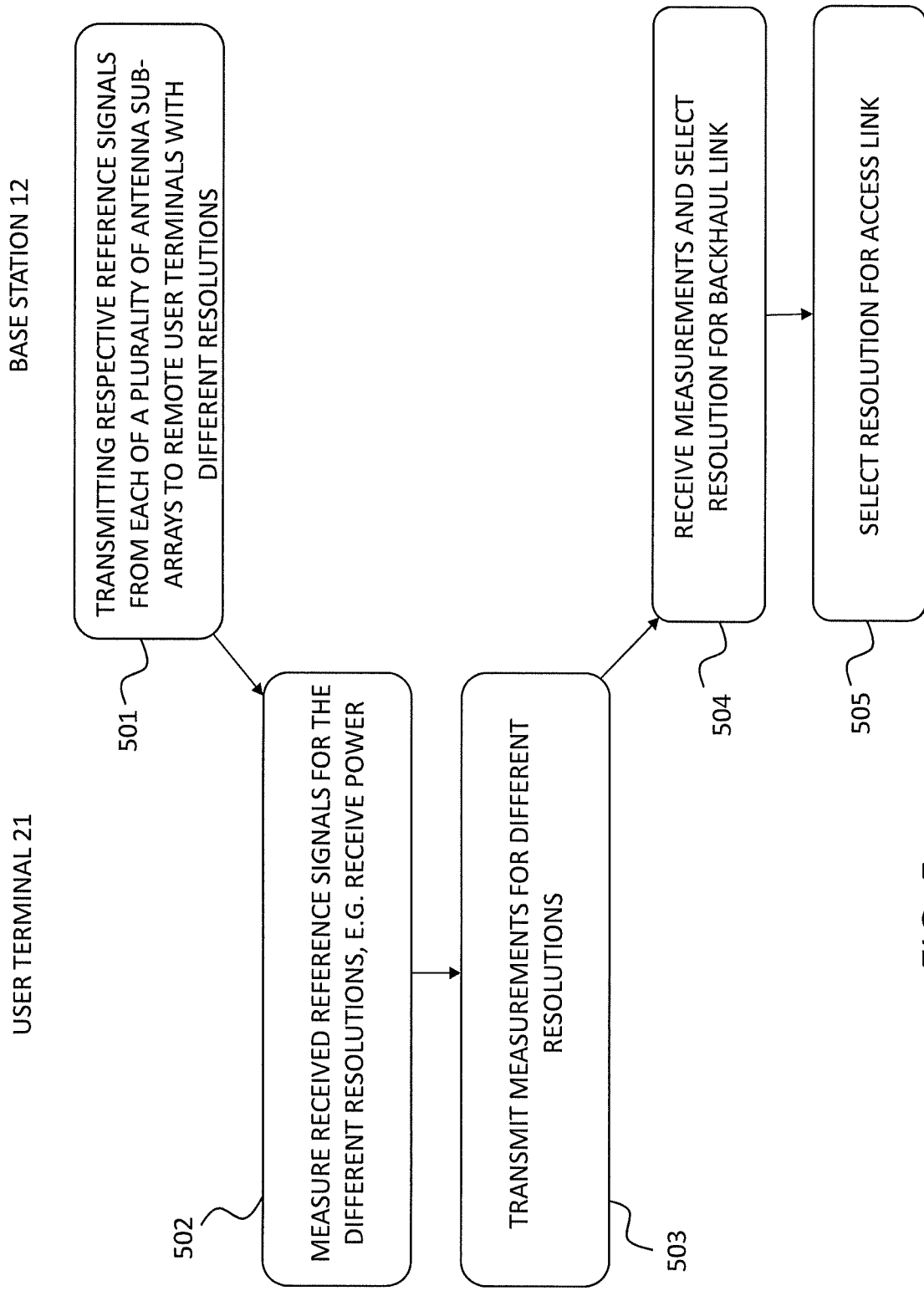
FIG. 5 is a flow diagram showing operations of an apparatus and a user terminal, according to an example embodiment.

FIG. 5 is a flow diagram indicating processing operations performed at the base station 12 and at a single user equipment 21. The operations may be performed by hardware, software or a combination thereof.

A first operation 501 may comprise, at the base station 12, transmitting reference signals from each of a plurality of antenna sub-arrays 36-41 with different resolutions to remote user equipment 21.

A further operation 502, at a user equipment 21, may comprise measuring the received reference signals for the different resolutions, e.g. measuring the receive power.

A further operation, 503, at the user equipment 21, may comprise transmitting the measurements for the different resolutions to the base station 12.

A further operation 504, at the base station 12, may comprise receiving the measurements and selecting the resolution (i.e. sub-array) for the backhaul link.

A further operation 505, also at the base station 12, may comprise selecting the resolution (from the remaining sub-arrays) for the access link.

Thus, in a multi-dimensional system and method, there may be provided a plurality of candidate backhaul beams corresponding to different sub-arrays 36-41. The maximal beamwidth of the candidate backhaul beams may be identified in such a way as to guarantee reachability of the required remote neighbouring node or nodes 18, 22, 24. The candidate backhaul beams may be narrowed down until interference to the user equipment 21 is within acceptable limits, e.g. minimal interference for all user equipment or within an acceptable range for a majority or predetermined number of user equipment.

In some embodiments, rather than providing sub-arrays 36-41 with different numbers of radiating elements 32, two or more sub-arrays may comprise identical numbers of radiating elements.

In such case, the different resolution or beamwidths may be determined by enabling different numbers of radiating elements 32, e.g. one in a first sub-array, two in a second sub-array, and so on.

FIG. 6 indicates the above process for a base station 62 in relation to a relay node 64. The base station 62 is assumed to comprise an antenna array having plurality of sub-arrays of which three 66, 68, 70 are shown. Each sub-array 66, 68, 70 is assumed to have a different resolution in terms of number of active radiating elements. The first sub-array 66 transmits a reference signal as a first beam 67 having a beamwidth appropriate for reaching the relay node 64. The second sub-array 68 subsequently transmits a reference signal as a second beam 69, having a narrower beamwidth, still appropriate for reaching the relay node 64. The third sub-array 70 subsequently transmits a reference signal as a third beam 71, having a narrower beamwidth than the second beam 69, still appropriate for reaching the relay node 64. In some embodiments, the first of the sub-arrays 66, 68, 70 for which the reported interference is within acceptable limits is used for backhaul communications.

Figure 7:
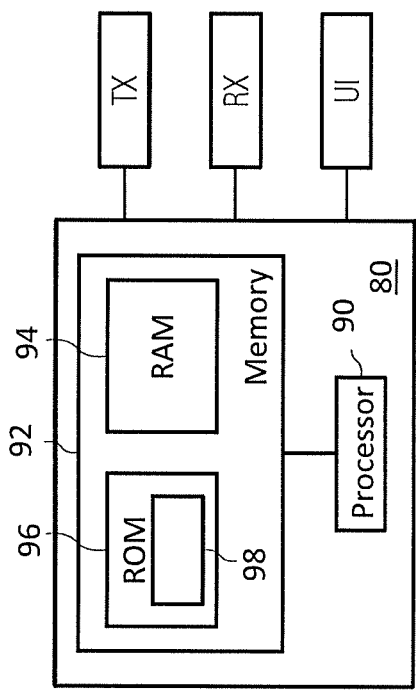
FIG. 7 is a block diagram of an apparatus according to an example embodiment.

FIG. 7 shows an apparatus 80 according to an embodiment. The apparatus 80 may provide controller functionality for an antenna array 30 and its associated circuitry. The apparatus comprises at least one processor 90 and at least one memory 92 directly or closely connected to the processor. The memory 92 includes at least one random access memory (RAM) 94 and at least one read-only memory (ROM) 96. Computer program code (software) 98 is stored in the ROM 96. The apparatus 80 may be connected to a RX path, for example to the antenna array 30, for receiving reported measurements from user equipment, and a TX path, for example to signal processing chains of the antenna array 30 to allocate different sub-arrays to backhaul communications and other sub-arrays to access communications. The apparatus 80 may be connected with a user interface UI for instructing the apparatus and/or for outputting results. The at least one processor 90, with the at least one memory 92 and the computer program code 98 may be arranged to cause the apparatus to at least perform at least the method according to one or more of FIGS. 4 and 5.

Figure 8:
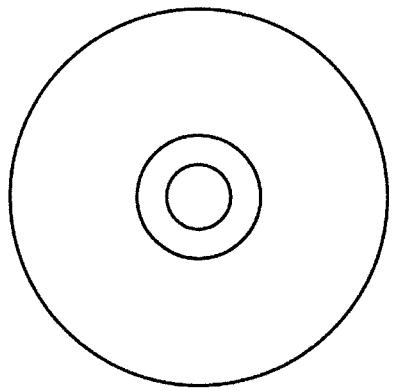
FIG. 8 is a schematic view of non-transitory media for storing computer readable code for performing operations according to an example embodiment.

FIG. 8 shows a non-transitory media according to some embodiments. The non-transitory media is a computer readable storage medium. It may be e.g. a CD, a DVD, a USB stick, a blue ray disk, etc. The non-transitory media stores computer program code causing an apparatus, such as that shown in FIG. 7, to perform the method of one or more of FIGS. 4 and 5 when executed by a processor such as the processor 90.

The memory may be volatile or non-volatile. It may be e.g. a RAM, SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

To summarize, some embodiments involve determining a maximum beamwidth $BW_{max}$ for a backhaul dedicated beam (i.e. the minimum backhaul sub-arrays in horizontal/vertical planes). The purpose is to guarantee minimum beamforming gain at a neighboring node for coverage purposes. $BW_{max}$ may refer to the maximum beamwidth over the candidate backhaul beams, of beamwidths $bw_{BH}$ with minimal received interference by a neighboring node. This process may be applied per candidate beamwidth. Iteratively, the backhaul beam may be narrowed down until interference to user equipment is reduced to an acceptable level from a statistical point of view.

This may be performed as follows:
Per candidate Backhaul beam:
SSB signals are transmitted with n possible beams $B_k$, k=1 . . . n of beamwidths $bw_{BH,k}$ (i.e.: n sets of sub-arrays) such that $bw_{BH,k} < BW_{max}$.
The user equipments in coverage $\{UE_i, i=1 \ldots N\}$ perform measurements and report to the base station node their received power measurement per candidate backhaul beam: $P_{i,k}$.
The base station collects these measurements and selects the maximal beamwidth for the backhaul that minimizes interference to user equipment.
The selected beam-width is $bw_{BH,k^*}$:
where $bw_{BH,k^*} = \max\{bw_{BH,k}, k=1 \ldots n/x \% \text{ of } \{P_{i,k}, i=1 \ldots N\} < I\_Threshold$ and where I_Threshold is configurable.

Sub-array radiating elements not used for backhauling communications may be used for access communications. By selecting the maximal backhaul beamwidth, which comes to allocating minimal subarrays (i.e.: minimum number of antennas elements) to the backhaul, we devote the maximal space to access beams. An advantage is to maximize the beamforming gain at the access level, taking advantage of the maximized number of antennas elements assigned to the access operation. The gain that increases with narrowing down the access beamwidths also reduces cross access link interference.

Embodiments may receive complete information on the received power level from all the beams transmitted at the different resolutions. This may be established in the initial backhaul connection setup.

As used herein, a "means" may comprise any of hardware, software, electrical circuitry and electronic circuitry for performing the stated processes. As used herein, a user equipment may be used interchangeable with user terminal or remote user terminal, and may comprise for example a mobile telephone, smartphone, tablet computer, laptop computer, personal computer or indeed any processing terminal having data communications capability.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising:
circuitry configured to transmit one or more reference signals, the one or more reference signals having a respective one or more resolutions corresponding to one or more respective beamwidths, over respective synchronization signal blocks to one or more remote user terminals, wherein the one or more remote user terminals is a communication endpoint, from each of a plurality of sub-arrays of an antenna array of the apparatus, each sub-array comprising a quantity of radiating elements of the antenna array configured to establish a backhaul link with a remote communications node, the apparatus being within a predetermined range of the remote communications node;
wherein the circuitry configured to transmit is configured to transmit the one or more reference signals sequentially, in descending order starting from the sub-array having a greatest beamwidth, such that the beamwidth exceeds a threshold so that a coverage area of the apparatus comprises the remote communications node for backhaul communications;
circuitry configured to receive measurement signals from the one or more remote user terminals corresponding to the one or more reference signals transmitted from each of the plurality of sub-arrays of the antenna array of the apparatus, the measurement signals indicative of one or more characteristics of the received reference signals;
circuitry configured to determine whether an interference or power level of the received measurement signals is within a range;
circuitry configured to select, based on the received measurement signals from the one or more remote user terminals, a first subset of the sub arrays of the antenna array of the apparatus for the backhaul communications with the remote communications node and the apparatus in response to a determination that the interference or power level of the measurement signals received from the one or more remote user terminals is within the range, the selected first subset of sub-arrays corresponding to a first subset of the one or more respective resolutions, and a second subset of the sub-arrays of the antenna array of the apparatus, comprising one or more of remaining sub-arrays that have not been selected for the backhaul communications, for access communications with the one or more remote user terminals and the apparatus, the selected second subset of sub-arrays corresponding to a second subset of the one or more respective resolutions;
wherein the circuitry configured to transmit is configured to repeat the sequential transmission in descending order of resolution and corresponding beamwidth, to reduce interference experienced with the one or more remote user terminals, until the interference or signal power level of the received measurement signals is within the range; and circuitry configured to reallocate periodically the sub-arrays of the antenna array used for the backhaul communications and for the access communications to account for changes in environmental or network conditions.

2. The apparatus of claim 1, wherein the circuitry configured to select is configured to select for the second subset all remaining sub-arrays for the access communications with the one or more remote user terminals.

3. The apparatus of claim 2, wherein the circuitry configured to receive the measurement signals is configured to receive measurement signals indicative of interference of the respective reference signals at the one or more remote user terminals, and the circuitry configured to select is configured to select the first subset of sub-arrays for the backhaul communications with the remote communications node and the apparatus corresponding to interference measured with the one or more remote user terminals being at or below an acceptable threshold.

4. The apparatus of claim 3, wherein the circuitry configured to select is further configured to select the first subset of sub-arrays for the backhaul communications corresponding to a maximum beamwidth of the sub-arrays of the first subset being above a threshold corresponding to a beam width, so that the apparatus is able to connect to the remote communications node over a backhaul connection for the backhaul communications, in addition to the measured interference being at or below the acceptable threshold.

5. The apparatus of claim 1, wherein the provided plurality of sub-arrays comprise different respective numbers of active radiating elements to provide different respective beamwidths, and wherein the provided plurality of sub-arrays comprise an identical respective number of radiating elements.

6. The apparatus of claim 5, wherein the maximum beamwidth of the respective sub-arrays of the first subset corresponds to a respective minimal number of the radiating elements of the respective sub-arrays in an azimuth and elevation plane.

7. The apparatus of claim 6, wherein the circuitry configured to receive is configured to receive measurement signals indicative of a received power of the respective reference signals by the one or more remote user terminals, and the circuitry configured to select is configured to select the first subset of sub-arrays for the backhaul communications with the remote communications node and the apparatus corresponding to the received power, as measured by the one or more remote user terminals, being at or below or above an acceptable power threshold.

8. The apparatus of claim 1, further comprising circuitry configured to communicate backhaul signals to the remote communications node using the selected first subset of sub-arrays and circuitry configured to communicate access signals to one or more user equipment using the remaining sub-arrays.

9. The apparatus of claim 1, wherein the reference signals are transmitted as beam reference signals.

10. The apparatus of claim 1, wherein a beam produced per sub-array of the antenna array of the apparatus, the beam corresponding to one of the resolutions, is formed based on weights applied to a base band pre-coder and on a plurality of analog phase shifters of radio frequency pre-coders of the apparatus.

11. A method, comprising:
transmitting one or more reference signals, the one or more reference signals having a respective one or more resolutions corresponding to one or more respective beamwidths, over respective synchronization signal blocks to one or more remote user terminals, wherein the one or more remote user terminals is a communication endpoint, from each of a plurality of sub-arrays of an antenna array of a device, each sub-array comprising a quantity of radiating elements of the antenna array configured to establish a backhaul link with a remote communications node, the device being within a predetermined range of the remote communications node;
wherein the transmitting comprises transmitting the one or more reference signals sequentially, in descending order starting from the sub-array having a greatest beamwidth, such that the beamwidth exceeds a threshold so that a coverage area of the device comprises the remote communications node for backhaul communications;
receiving measurement signals from the one or more remote user terminals corresponding to the one or more reference signals transmitted from each of the plurality of sub-arrays of the antenna array of the device, the measurement signals indicative of one or more characteristics of the received reference signals;
determining whether an interference or power level of the received measurement signals is within a range;
selecting, based on the received measurement signals from the one or more remote user terminals, a first subset of the sub-arrays of the antenna array of the device for the backhaul communications with the remote communications node and the device performing the transmitting and receiving in response to a determination that the interference or power level of the measurement signals received from the one or more remote user terminals is within the range, the selected first subset of sub-arrays corresponding to a first subset of the one or more respective resolutions, and a second subset of the sub-arrays, comprising one or more of remaining sub-arrays of the antenna array of the device that have not been selected for the backhaul communications, for access communications with the one or more remote user terminals and the device performing the transmitting and receiving, the selected second subset of sub-arrays corresponding to a second subset of the one or more respective resolutions;
repeating the sequential transmission in descending order of resolution and corresponding beamwidth, to reduce interference experienced with the one or more remote user terminals, until the interference or signal power level of the received measurement signals is within the range; and
reallocating periodically the sub-arrays of the antenna array used for the backhaul communications and for the access communications to account for changes in environmental or network conditions.

12. The method of claim 11, comprising selecting for the second subset all remaining sub-arrays for the access communications with the one or more remote user terminals.

13. The method of claim 12, wherein receiving comprises receiving measurement signals indicative of interference of the respective reference signals at the one or more remote user terminals, and selecting comprises selecting the first subset of sub-arrays for the backhaul communications with the remote communications node and the device corresponding to interference measured with the one or more remote user terminals being at or below an acceptable threshold.

14. The method of claim 13, wherein selecting comprises selecting the first subset of sub-arrays for the backhaul communications corresponding to a maximum beamwidth of the sub-arrays of the first subset being above a threshold corresponding to a beam width, so that the device is able to connect to the remote communications node over a backhaul connection for the backhaul communications, in addition to the measured interference being at or below the acceptable threshold.

15. The method of 14, wherein the maximum beamwidth of the respective sub-arrays of the first subset corresponds to a respective minimal number of the radiating elements of the respective sub-arrays in an azimuth and elevation plane.

16. The method of claim 11, wherein the transmitting, the receiving, and the selecting is performed using an apparatus remote from the device.

17. A non-transitory computer program product comprising a set of instructions which, when executed on an apparatus, are configured to cause the apparatus to:

transmit one or more reference signals, the one or more reference signals having a respective one or more resolutions corresponding to one or more respective beamwidths, over respective synchronization signal blocks to one or more remote user terminals, wherein the one or more remote user terminals is a communication endpoint, from each of a plurality of sub-arrays of an antenna array of a device comprising the non-transitory computer program product, each sub-array comprising a quantity of two or more radiating elements of the antenna array configured to establish a backhaul link with a remote communications node, the apparatus being within a predetermined range of the remote communications node;

wherein the transmitting comprises transmitting the one or more reference signals sequentially, in descending order starting from the sub-array having a greatest beamwidth, such that the beamwidth exceeds a threshold so that a coverage area of the apparatus comprises the remote communications node for backhaul communications;

receive measurement signals from the one or more remote user terminals corresponding to the reference signals transmitted from each of the plurality of sub-arrays of the antenna array of the device, the measurement signals indicative of one or more characteristics of the received reference signals;

determine whether an interference or power level of the received measurement signals is within a range;

select, based on the received measurement signals from the one or more remote user terminals, a first subset of the sub-arrays of the antenna array of the device for the backhaul communications with the remote communications node and the device in response to a determination that the interference or power level of the measurement signals received from the one or more remote user terminals is within the range, the selected first subset of sub-arrays corresponding to a first subset of the one or more respective resolutions, and a second subset of the sub-arrays, comprising one or more of remaining sub-arrays of the antenna array of the device that have not been selected for the backhaul communications, for access communications with the one or more remote user terminals and the device, the selected second subset of sub-arrays corresponding to a second subset of the one or more respective resolutions; and repeat the sequential transmission in descending order of resolution and corresponding beamwidth, to reduce interference experienced with the one or more remote user terminals, until the interference or signal power level of the received measurement signals is within the range, and reallocate periodically the sub-arrays of the antenna array used for the backhaul communications and for the access communications to account for changes in environmental or network conditions.

\* \* \* \* \*